(12) United States Patent
Allen

(10) Patent No.: US 12,293,506 B2
(45) Date of Patent: May 6, 2025

(54) METHOD TO LOCATE DEFECTS IN E-COAT

(71) Applicant: INOVISION SOFTWARE SOLUTIONS, INC., Chesterfield, MI (US)

(72) Inventor: Jacob Nathaniel Allen, Shelby Township, MI (US)

(73) Assignee: INOVISION SOFTWARE SOLUTIONS, INC., Chesterfield, MI (US)

( * ) Notice: Subject to any disclaimer, the term of this patent is extended or adjusted under 35 U.S.C. 154(b) by 355 days.

(21) Appl. No.: 17/869,147

(22) Filed: Jul. 20, 2022

(65) Prior Publication Data

US 2023/0025165 A1    Jan. 26, 2023

Related U.S. Application Data

(60) Provisional application No. 63/223,676, filed on Jul. 20, 2021.

(51) Int. Cl.
*G06T 7/80* (2017.01)
*B05D 7/14* (2006.01)
(Continued)

(52) U.S. Cl.
CPC ............ *G06T 7/0004* (2013.01); *B05D 7/142* (2013.01); *C25D 13/12* (2013.01); *G06T 7/80* (2017.01);
(Continued)

(58) Field of Classification Search
CPC .......... G06T 7/0004; G06T 7/80; G06T 7/90; G06T 2207/10024; G06T 2207/10036;
(Continued)

(56) References Cited

U.S. PATENT DOCUMENTS 3,416,340 A    12/1968  Reesor
4,476,981 A    10/1984  Yoshida
(Continued)

FOREIGN PATENT DOCUMENTS

CA    2684365 A1    10/2008
DE    4123916 A1     1/1992
(Continued)

OTHER PUBLICATIONS

Written Opinion of the International Search Authority dated Sep. 30, 2021.
(Continued)

*Primary Examiner* — Ali Bayat
(74) *Attorney, Agent, or Firm* — Jacob M. Ward; Ward Law Office LLC

(57) ABSTRACT

A method of locating a defect in an e-coat on a surface can include acquiring an image of the surface. A correction coefficient can be applied to the image to form an adjusted image. The correction coefficient can relate pixel values of the image to a calibration value. The adjusted image can be separated into a spectral component which can be modified by a block average determination to create a modified spectral component. The spectral components can be compared with the modified spectral components to form a difference image. The difference image can be dilated and eroded. A region of interest can be identified from an image region using a blob detection. The defect can be classified as a defect type. The defect can be repaired or a coding parameter can be altered based on the defect.

19 Claims, 11 Drawing Sheets

(51) Int. Cl.
  *C25D 13/12* (2006.01)
  *G06T 7/00* (2017.01)
  *G06T 7/90* (2017.01)
(52) U.S. Cl.
  CPC ...... *G06T 7/90* (2017.01); *G06T 2207/10024* (2013.01); *G06T 2207/10036* (2013.01); *G06T 2207/20182* (2013.01); *G06T 2207/30156* (2013.01)
(58) Field of Classification Search
  CPC . G06T 2207/20182; G06T 2207/30156; G06T 2207/20036; G06T 2207/20081; G06T 2207/20084; G06T 7/001; B05D 7/142; B05D 5/005; C25D 13/12; C25D 13/22
  USPC ........................................................ 382/219
  See application file for complete search history.

(56) References Cited

U.S. PATENT DOCUMENTS

| | | | |
|---|---|---|---|
| 4,675,730 | A | 6/1987 | Adomaitis et al. |
| 4,678,920 | A | 7/1987 | Iadipaolo et al. |
| 5,087,822 | A | 2/1992 | Fairlie et al. |
| 5,090,804 | A | 2/1992 | Wong et al. |
| 5,216,481 | A | 6/1993 | Minato |
| 5,408,104 | A | 4/1995 | Gorria et al. |
| 5,642,198 | A | 6/1997 | Long |
| 5,726,705 | A | 3/1998 | Imanishi et al. |
| 5,734,742 | A | 3/1998 | Asaeda et al. |
| 5,844,801 | A | 12/1998 | Kodama et al. |
| 5,926,268 | A | 7/1999 | Bonewitz et al. |
| 6,239,436 | B1 | 5/2001 | Parker et al. |
| 6,266,138 | B1 | 7/2001 | Keshavmurthy |
| 6,278,517 | B1 | 8/2001 | Willing |
| 6,320,654 | B1 | 11/2001 | Alders et al. |
| 6,359,686 | B1 | 3/2002 | Ariglio et al. |
| 6,398,870 | B1 | 6/2002 | Kaya et al. |
| 6,462,813 | B1 | 10/2002 | Haven et al. |
| 6,496,219 | B1 | 12/2002 | Porret et al. |
| 6,509,964 | B2 | 1/2003 | Wiles et al. |
| 6,532,006 | B1 | 3/2003 | Takekawa et al. |
| 6,532,066 | B1 | 3/2003 | Filev et al. |
| 6,661,911 | B1 | 12/2003 | Ishikura et al. |
| 6,714,831 | B2 | 3/2004 | Matthews et al. |
| 6,804,386 | B1 | 10/2004 | Nakayama et al. |
| 6,941,016 | B1* | 9/2005 | Wagman ............... G06T 7/0004 382/199 |
| 7,019,826 | B2 | 3/2006 | Vook et al. |
| 7,020,580 | B2 | 3/2006 | Peters et al. |
| 7,105,848 | B2 | 9/2006 | Guha et al. |
| 7,171,037 | B2 | 1/2007 | Mahon et al. |
| 7,206,442 | B1 | 4/2007 | Herod et al. |
| 7,420,671 | B2 | 9/2008 | Sonda |
| 7,796,248 | B2 | 9/2010 | Sonda |
| 8,365,580 | B2 | 2/2013 | Stumpf |
| 8,922,641 | B2 | 12/2014 | Bertin et al. |
| 9,116,071 | B2 | 8/2015 | Hatcher, Jr. et al. |
| 9,438,864 | B2 | 9/2016 | Swinford |
| 9,709,463 | B2 | 7/2017 | DeAscanis et al. |
| 9,747,680 | B2 | 8/2017 | Tai et al. |
| 9,874,516 | B2 | 1/2018 | Mann et al. |
| 9,964,401 | B2 | 5/2018 | Deschenes et al. |
| 9,970,887 | B2 | 5/2018 | Matsumoto |
| 10,007,981 | B2 | 6/2018 | Gangitano et al. |
| 10,036,712 | B2 | 7/2018 | Kuai et al. |
| 10,063,758 | B2 | 8/2018 | Scheich |
| 10,082,470 | B2 | 9/2018 | Shortt et al. |
| 10,176,588 | B2 | 1/2019 | Trenholm et al. |
| 10,261,028 | B2 | 4/2019 | Cilip et al. |
| 10,281,029 | B2 | 5/2019 | Pfeifer |
| 10,462,444 | B2 | 10/2019 | Wolke et al. |
| 10,482,347 | B2 | 11/2019 | Uffenkamp et al. |
| 10,508,994 | B2 | 12/2019 | Ando |
| 10,508,995 | B2 | 12/2019 | Mayumi |
| 10,511,827 | B2 | 12/2019 | Peeters et al. |
| 10,520,449 | B2 | 12/2019 | Piana |
| 10,556,261 | B2 | 2/2020 | Winchip et al. |
| 10,560,634 | B2 | 2/2020 | Ando |
| 10,591,285 | B2 | 3/2020 | Ando |
| 10,596,754 | B2 | 3/2020 | Williams et al. |
| 10,666,927 | B2 | 5/2020 | Bendall |
| 10,934,023 | B2 | 3/2021 | Li |
| 2002/0024659 | A1 | 2/2002 | Tanaka |
| 2002/0101583 | A1 | 8/2002 | Ariga |
| 2002/0109112 | A1* | 8/2002 | Guha ..................... G06T 7/0004 250/559.46 |
| 2002/0110269 | A1* | 8/2002 | Floeder ................. G01N 21/89 382/141 |
| 2002/0141632 | A1 | 10/2002 | Engelbart et al. |
| 2003/0139836 | A1 | 7/2003 | Matthews et al. |
| 2006/0226380 | A1 | 10/2006 | Koike et al. |
| 2007/0115464 | A1 | 5/2007 | Harding et al. |
| 2008/0164316 | A1 | 7/2008 | Patel et al. |
| 2008/0310701 | A1 | 12/2008 | Caroli et al. |
| 2010/0182433 | A1 | 7/2010 | Shimbo et al. |
| 2012/0131766 | A1 | 5/2012 | van Glabbeek et al. |
| 2012/0262566 | A1 | 10/2012 | Grzegorczyk et al. |
| 2012/0327217 | A1 | 12/2012 | Anayama et al. |
| 2013/0057678 | A1* | 3/2013 | Prior Carrillo .... G01N 21/8806 348/125 |
| 2013/0113915 | A1* | 5/2013 | Scheid ............. G05B 19/41875 348/82 |
| 2013/0343632 | A1 | 12/2013 | Urano et al. |
| 2014/0021260 | A1 | 1/2014 | Cherry et al. |
| 2014/0055604 | A1 | 2/2014 | Delaney |
| 2014/0193065 | A1 | 7/2014 | Chu et al. |
| 2014/0210997 | A1 | 7/2014 | Blanchard et al. |
| 2014/0270347 | A1* | 9/2014 | Xu ..................... G06F 18/24323 382/199 |
| 2014/0341462 | A1 | 11/2014 | Sezginer et al. |
| 2014/0347446 | A1 | 11/2014 | Frandsen, Jr. et al. |
| 2015/0071523 | A1 | 3/2015 | Herrmann et al. |
| 2015/0116543 | A1 | 4/2015 | Mitarai |
| 2016/0110858 | A1 | 4/2016 | Liu et al. |
| 2017/0277979 | A1 | 9/2017 | Allen et al. |
| 2017/0346996 | A1 | 11/2017 | Kida |
| 2018/0322623 | A1 | 11/2018 | Memo et al. |
| 2018/0326591 | A1 | 11/2018 | Hausler |
| 2019/0096057 | A1 | 3/2019 | Allen et al. |
| 2020/0344449 | A1 | 10/2020 | Allen et al. |

FOREIGN PATENT DOCUMENTS

| | | |
|---|---|---|
| EP | 0983853 A1 | 3/2000 |
| EP | 0997201 B1 | 12/2005 |
| GB | 2282444 B | 6/1997 |
| JP | 59-90035 A | 5/1984 |
| JP | 61-149814 A | 7/1986 |
| JP | 7-209199 A | 8/1995 |
| JP | 4583514 B2 | 11/2010 |
| WO | 2008125702 A1 | 10/2008 |
| WO | 2011144964 A1 | 11/2011 |
| WO | 2020044178 A1 | 3/2020 |

OTHER PUBLICATIONS

Instituto De Diseno Y Fabricacion Automocion 2013—Spain (A Brochure) and a website including the attached pages labelled "Ford Project" Authored by the Institute of Design and Manufacturing in 2013 and providing the brochure referenced above and located at www.institutoidf.com.

Nirbhar Neogi et al—Review Of Vision—Based Steel Surface Inspection Systems-Article—Journal Of Image And Video Processing 2014, 2014:50 (http://jivp.eurasipjournals.com/contenU2014/1/50)—published in the Eurasip Journal On Image And Video Processing in 2014.

Muehlemann—Standardizing Defect Detection For The Surface Inspection Of Large Web Steel—Article published by Illumination Technologies in 2000.

Leopoldo Armesto et al , Inspection System Based On Artificial Vision For Paint Defects On Car Bodies, IEEE International Con-

(56) References Cited

OTHER PUBLICATIONS ference On Robotics And Automation (ICRA), May of 2011, and found on www.ieeexplore.ieee.org.

Leopoldo Armesto, Quality Control Of Car-Bodies Based On Artificial Vision, European Automotive Congress, Jun. 2011.

Icemi S.L., Training Manual- Automated Inspection System (AIS) Dirt In Paint (DIP)—Training Manual—May of 2013 and given to and used by Ford Motor Company, for example, in the Ford Kentucky Plant.

Andreas Hahn et al, Defect Classification On Specular Surfaces Using Wavelets, Article, 2013, Springer-Verlag Berlin, Heidelberg, 2013.

Tan-Toan Le, Mathias Ziebarth, Thomas Greiner, Michael Heizmann, Inspecton of Specular Surfaces Using Optimized M-Channel Wavelets, Article, International Conference on Acoustics, Speech, and Signal Processing, May 26-31, 2013 ICASSP 2013.

Soren Kammel and Fernando Puente Leon, Deflectometric Measurement of Specular Surfaces, 2008, Article, IEEE Transactions on Instrumentation and Measurement, vol. 57, No. 4. Apr. 2008.

Th. Laengle, D. Paul, M. Hartrumpf, and G. Struck, Image Fusion for Automatic Inspection of Moving Surfaces, Article, 2006, IEEE International Conference on Mul Tisensor Fusion and Integration for Intelligent Systems, Sep. 3-6, Heidelberg, Germany 2006.

David H. Eberly—"3D Game Engine Design—a Practical Approach to Real-Time Computer Graphics" second edition—Book—Morgan Kaufmann Publishers—500 Sansome Street—Suite 400—San Francisco, California 94111. Section 3.4.3 Clipping, pp. 93-99 and Section 3.7.2 Clipping a Triangle Mesh, pp. 133-137.

Frank D. Luna—"Introduction To 3D Game Programming With DirectX &11 ", book, Mercury Learning And Information, LLC, 22841 Quicksilver Drive, Dulles, VA 20166, 2012—ISBN 978-1-9364202-2-3.—Library of Congress Control No. 20122931119. Section 21.3 Projective Texture Coordinates, pp. 669-673, and Chapter 10 Stenciling, pp. 371-397.

* cited by examiner

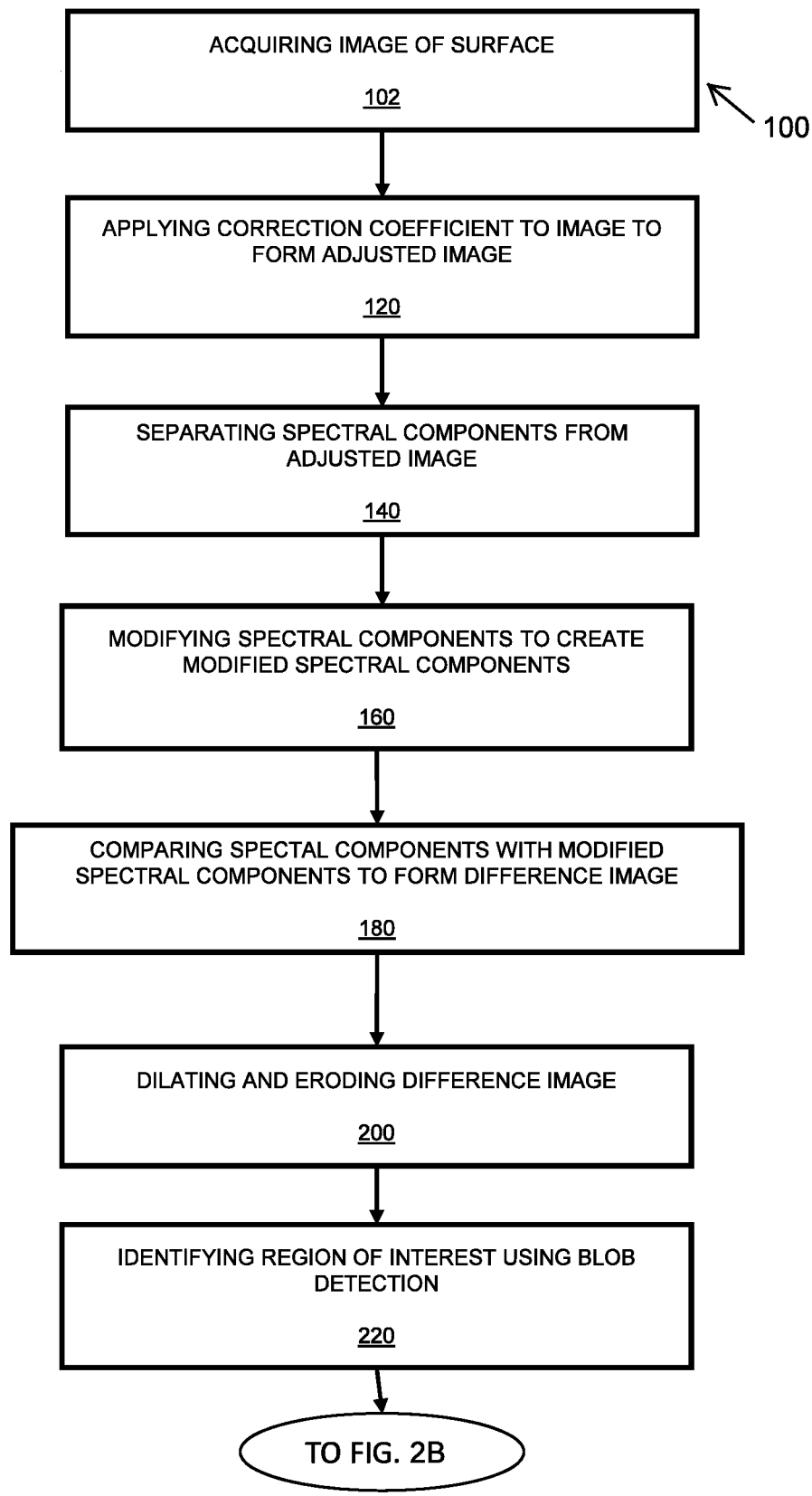

METHOD TO LOCATE DEFECTS IN E-COAT

CROSS-REFERENCE TO RELATED APPLICATIONS

This application claims the benefit of U.S. Provisional Application No. 63/223,676, filed on Jul. 20, 2021. The entire disclosure of the above application is incorporated herein by reference.

FIELD

The present technology relates to vision systems and, more particularly, to system and method for locating defects in paint.

INTRODUCTION

This section provides background information related to the present disclosure which is not necessarily prior art.

The vehicle manufacturing process requires several stages, such as stamping, welding, painting or electrophoretic coating (e-coating), part forging, and part assembly. Some of the vehicle manufacturing stages are automated, while others are done manually. One of the steps that is predominately done manually is painting or e-coating. E-coating is the process of depositing certain particles onto the surface of a piece of metal. This is done by placing coating materials, such as resins, pigments and additives, in a water bath to create a solution. The parts of the car are then immersed in the solution and an electrical current is passed through the bath using the parts as an electrode. The e-coat can protect the surface, edges, and cavities of the car body from corrosion as well as provide a base for applying subsequent layers of paint.

Undesirably, because e-coating is done in a manufacturing environment, the process can often yield defects that can occur on the surface of the part. These defect and imperfections can be caused by dirt, craters, fibers, glue, sealer, fingerprints, mapping, condensation, or other contaminants in the paint, e-coating, air, or present on the part. These defects in the finish of the surface can result in the paint or e-coating not adhering to the surface properly, an increase in the frequency at which paint or e-coating chipping, a rougher surface in which dirt can easily collect, and an overall unappealing aesthetic.

Accordingly, there is a need for a method for locating defects in e-coats.

SUMMARY

In concordance with the instant disclosure, methods and systems for locating defects in e-coats, have surprisingly been discovered.

In one embodiment, a method of locating a defect in an e-coat on a surface can include acquiring an image of the surface. A correction coefficient can be applied to the image to form an adjusted image. The correction coefficient can relate pixel values of the image to a calibration value. The adjusted image can be separated into a spectral component. The spectral component can be modified by a block average determination to create a modified spectral component. The spectral components can be compared with the modified spectral components to form a difference image. The difference image can be dilated and eroded. A region of interest can be identified from one or more image regions using a blob detection threshold value to locate the defect. The defect can be classified as a defect type. The defect can be repaired, or a coding process parameter can be altered based on the identification of the defect.

In another exemplary embodiment, a method for locating defects in e-coats can be described as hereinbelow. An image can be acquired using a method similar to a current clearcoat system. A vehicle can move on a conveyor and the vehicle's position can be tracked with the precision of at least 2 mm resolution. This can be achieved by using a rotary encoder, laser, or other similar tracking device. An X-position can be calculated with respect to a start position. The start position can be established by using a vehicle tripping photo eye.

A trigger table can define the X-positions while a camera takes images of the vehicle's surface and the surface of the vehicle is illuminated by a plurality of lights. The typical spacing of the vehicle's X-position travel between subsequent frames can be about 3-8 mm.

Images can be taken using a color camera. As a non-limiting example, the type of camera can include a JAI Go™ series color camera (e.g., the Go-5100C-PGE) with a Bayer pixel format. An algorithm (such as interpolation) can be applied to convert the Bayer pixel image format to a color image format having Red Green Blue (RGB) values for each pixel. If the Red, the Green, and the Blue values each have 8 bits, then the range in values for each can be from 0-255.

A color calibration plate can be used to find color correction coefficients to make RGB values of each pixel closer to an expected RGB values of color calibration plate. An XRite™ passport color calibration plate can be used to find three multiplier values for red, green, and blue. The color calibration plate can minimize the error between the colors after the multipliers are applied verses the expected RGB values of the color squares on the calibration plate. Images captured by the camera can have RGB values adjusted by these multipliers. Frames at a given X-position can be associated with a frame id number.

At a given X-position, the surface area and light illumination can be similar from vehicle to vehicle. Masks to crop areas of the image can be defined for a given X-position (likewise for a given frame id number). Masked and cropped areas can be ignored for image processing purposes.

Images can be processed on a GPU to take advantage of parallel processing on the GPU. The objective of image processing for an image frame can include finding where defects are present on e-coat surface. Non-limiting examples of the defects on e-coat can include glue, sealer, fingerprints, mapping, fibers, dirt, craters, condensation, etc.

An adjusted color image can be separated by RGB to three monochrome images: red, green, and blue. A fourth monochrome grey image can be created by assigning the maximum value of the red, green, or blue value at the pixel to the grey image pixel.

The grey image can be processed by a BlockAverage process. The BlockAverage process can input a block width, a block height, and a percentile limit. The image can then be divided into blocks having the specified block width and block height. The pixels in each block can be sorted by intensity into a histogram of pixel intensity values (for 8-bit images, this histogram can have buckets that range from 0-255). The histogram can be used to calculate the percentile of the pixel intensities. Any pixels below the percentile limit intensity percentile can be discarded, and pixels above (1—the percentile limit intensity percentile) can be discarded. So, for example, if the percentile limit is 0.1, then the pixel values below the tenth percentile intensity level can be discarded, and pixels above the 90th percentile intensity value can be discarded. All the remaining pixel values that have not been discarded, as recorded in the histogram, can then be used to calculate an average pixel intensity. Once the average pixel intensity of the remaining pixels is calculated, the entire block of pixels can be replaced by this average pixel intensity. In this way, a second layered average image can be created from the block averages.

A difference from background image can be created by iterating over each pixel in the background intensity image to find the difference between the background image pixel and the grey image pixel at the same X,Y image coordinate to create a difference image. If the difference at the pixel is less than a threshold value, then the difference image pixel can be 0. Otherwise, the difference image pixel will be the same as the absolute value of the difference. The threshold can be set to be adjusted according to changes in the average intensity value. A predefined table of threshold values can be used to map a threshold value to each possible background intensity value. So, for example, the difference threshold may be relatively low at 10 if the average value is less than 40, however it can increase to 15 when the value is higher than 80 and go as high as 35 if the value is greater than 220.

The difference image can then be eroded to remove noise. For example, the difference image can be eroded by 1 pixel, and then eroded by 1 pixel again, and then eroded by 1 pixel again to produce an eroded image. Then, a new final eroded image can be created by merging the eroded image with the difference image according to the following method. First, zero out the pixel value in the difference image. However, if the pixel value is greater than some threshold (for example 40) or the pixel still exists in the eroded image the pixel value should not be zeroed out. Desirably, the final eroded image can have less noisy pixels.

The final eroded image can then be processed by a series of dilations and erosions to create connected regions. For example, the image can be processed by a sequence of 3 dilations having radius of 4, followed by 3 erosions also having radius of 4 to produce a regions image.

Next, the defect regions of interest in the region image can be located. For each region, pixels can be zeroed out unless they are greater than 0 in the final eroded image and greater than 0 in the regions image. These saved pixels can be used to define the final regions. Any regions having less than 5 saved pixels can be discarded. A color version of the defect is created by taking the color values from adjusted color image using the saved pixels' X and Y values. A bounding box can be calculated to encompass the saved pixels. The saved pixels and bounding box can be used to create a defect region of interest for each defect region found.

The defect region of interest can have classification information associated to it beyond just the bounding box and saved pixels. Information can include color information because different e-coat defects can have different color. Color can also be used to filter out noise because e-coat color is usually the same for the entire vehicle. The size of the region can also be used to filter out noise. Once defect regions of interest are extracted from an image, they can be associated with the frame ID and the X-position.

Subsequently, as is already done for clear coat systems and described in other patent applications, the defect regions of interest that are found can be passed through a classifier to be sorted into various defect types or to be classified as noise and rejected. The classifier can include an SVM, or a deep learning coevolution neural network, such as a variation of AlexNet™. The features supplied to the classifier can include color as well as features currently used in clear coat systems, such as shape, position, size, and probability of noise being found on a camera frame at a given X-position.

After a defect region of interest has been passed through a classification step, a hit testing approach can be used to find the location of the defect on the surface of the vehicle. The hit test can use the calibrated position of the camera and simulates the vehicle using a 3D CAD model of the vehicle located at the simulated X-position of the vehicle when the image was taken. Next, hit testing can be used to trace a ray from the center pixel of the defect region of interest in computer simulation until it intersects with a point on the 3D vehicle model. When hit testing is successful, the expected surface normal can be also available from the 3D model. Hit testing for the region can also be repeated at each corner of the region.

Because images are taken frequently as the vehicle is scanned (which can be approximately every 4 mm of travel) multiple images of the same defect can be captured, which can result in multiple defect regions of interest for the same defect. When defect regions of interest are repeated in more than one image frame, they still can have the same hit test location on the 3D vehicle (which can be close within some threshold specified in mm and commonly less than 2 mm). A clustering step can take all the defect regions of interest and build a cluster from defect regions of interest located close to each other on the vehicle's surface based on comparisons of the hit test locations. Defect regions of interest that cluster together can be assumed to be the same defect and can be studied as a group to find the best classification, size, and location estimate of the defect.

Once a defect's type and location are found from a plurality of the defect regions of interest, the information can be used to alert repair operators to the defect, to store quality data used to measure and improve the paint shop processes, and/or to inform an automatic repair system (such as a robot) about a defect's location, size, and type.

Color variations in images of e-coat surfaces can be used as a signal to detect and classify defects. The calculate color distance process can receive the grey image and also the color adjusted red, green, and blue images for comparison with the background (layered) image. The grey intensities of pixels in the background image can be converted to a background integer value (between 0 and 255 for 8-bit grey images) using a rounding or truncation operation. Each pixel value in the grey image can be subtracted from the corresponding (same X,Y coordinate) pixel value in the background image. If the absolute value of this background difference is less than a threshold (for example 2) then the pixel location can be considered part of the e-coat background. Red, Green, and Blue intensity values of pixels considered part of the e-coat background can be sorted according to the background integer value at the pixel location.

Next, the average Red, Green, and Blue intensity values for each background integer value can be calculated by averaging the red, green, and blue pixel values at each background integer. Finally, a color distance image can be created by iterating over each pixel in the background image, converting the background pixel value to an integer value, looking up the average RGB intensity for that background value, and then finding the difference between the average Red, Green, and Blue intensity values and the adjusted color image's Red, Green, and Blue values respectively.

The Red Green and Blue channel differences can be used to generate a color image that signals where color is different from the standard e-coat color. The absolute value of the vector magnitude of the RGB differences at each pixel can also be used to create a monochrome color variation image that highlights where color is different from the expected e-coat color. This monochrome color variation image can be used to filter out noise regions and/or to identify defect type. For example, it is possible to iterate over the non-zero pixels in a defect region of interest and tally the 5 highest value corresponding (X,Y coordinate) monochrome color variation image pixels. If this tally is lower than a threshold the region can be discarded as noise. Similarly, the corresponding red, green, and blue color differences can be used as components of feature vectors for a classifier for sorting out the defect type because different types of defects on e-coat can have different colors.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic side elevational view of a system for locating a defect in an e-coat on a surface, which can be used to implement a method to locate defects in e-coat, as shown in FIGS. 2A and 2B;

FIGS. 2A and 2B form a flow diagram illustrating the method to locate defects in e-coat;

DETAILED DESCRIPTION

Figure 1:
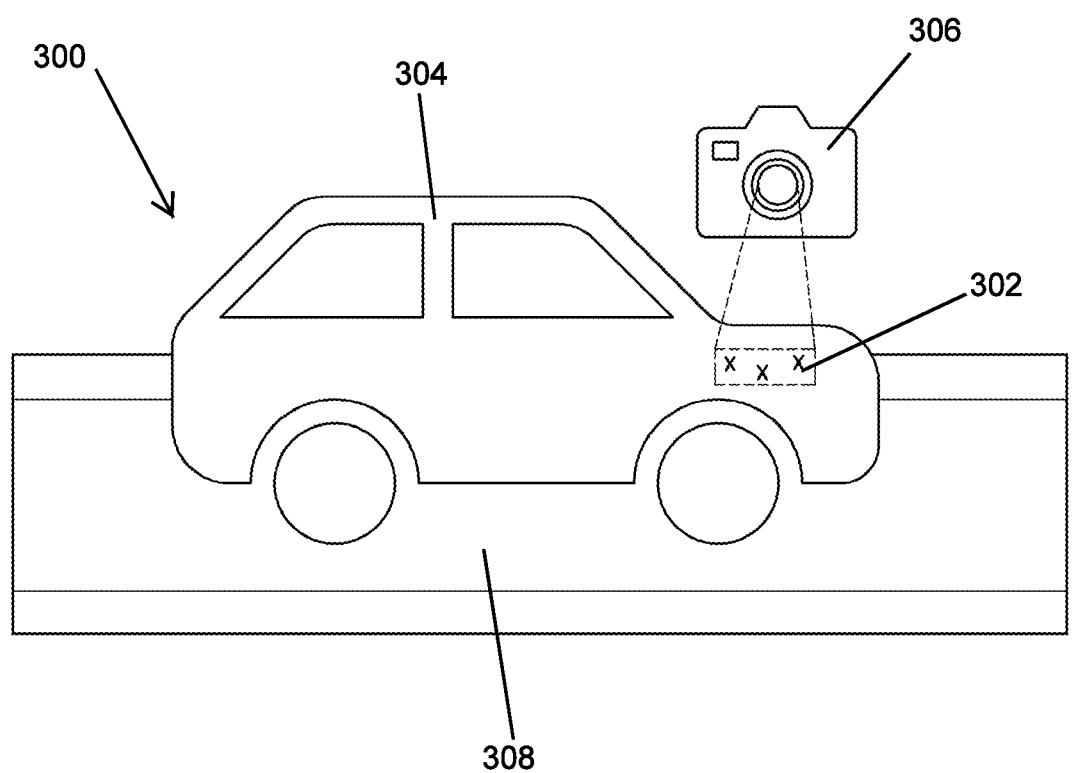

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a method 100 to locate defects in e-coat on a surface, shown in FIG. 1 and shown generally in the accompanying figures. Advantageously, the method 100 can distinguish between prospective defects that are real defects and prospective defects that are noise.

Figure 2B:
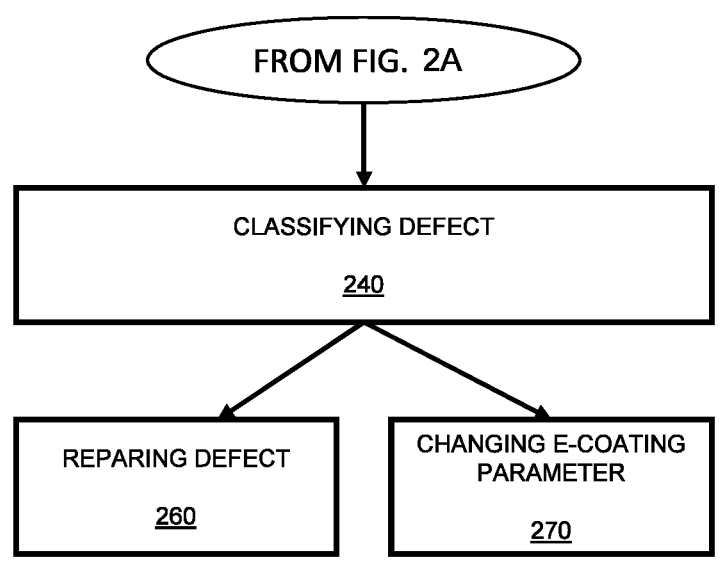
Figure 3:
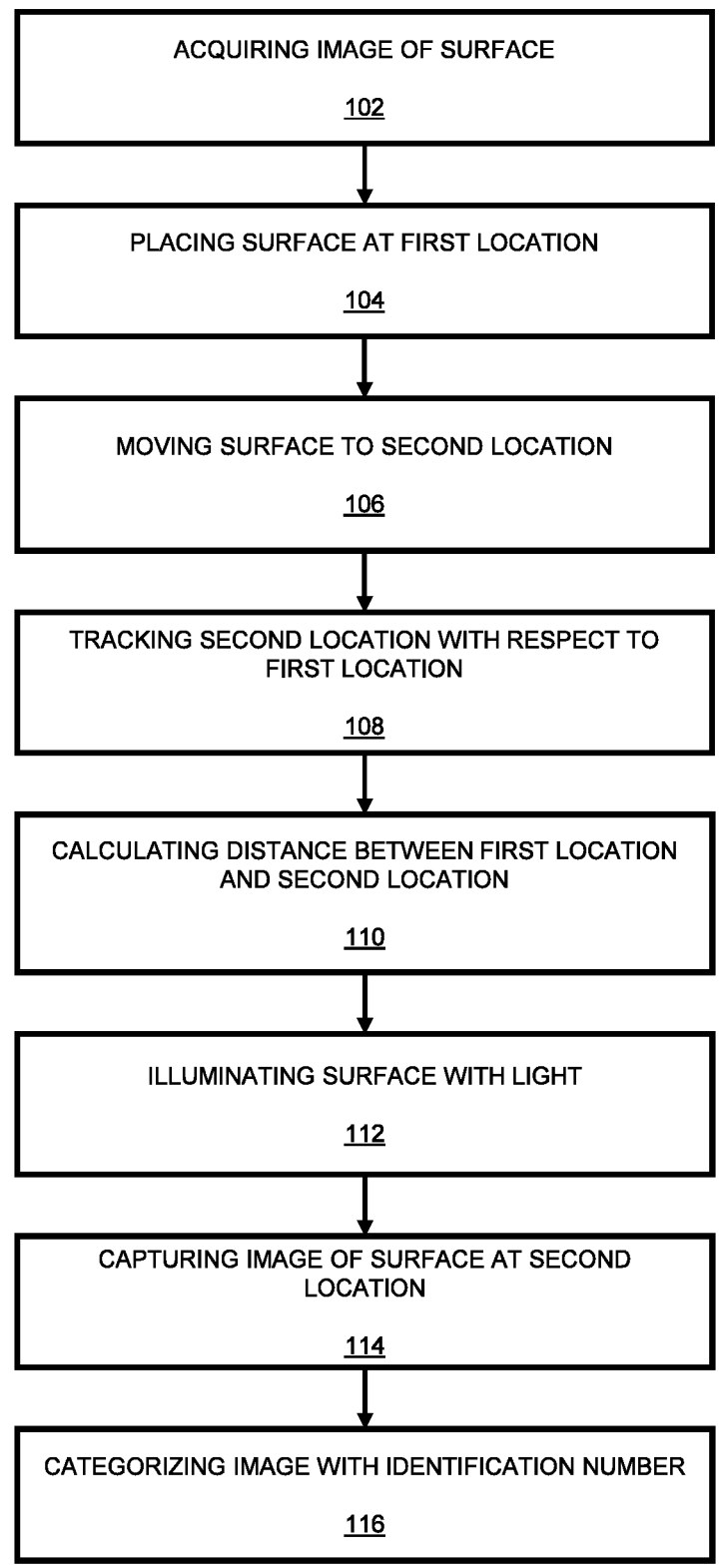
FIG. 3 is a flow diagram illustrating the step of acquiring the image.

As shown in FIGS. 2A-2B, the method to locate a defect in an e-coat on a surface can include a step 102 of acquiring an image of the surface. With reference to FIG. 3, the step 102 of acquiring an image of the surface can include a step 104 of placing the surface on a conveyor at a first location. The first location can be established by the surface tripping a photo eye. The surface can be moved along the conveyor to a second location space away from the first location in a step 106. The second location can be selected from a predetermined trigger table. In a step 108, the second position can be tracked with respect to the first position using a tracking device. The tracking device can be a rotary encoder or a laser. One of ordinary skill in the art can select other suitable tracking devices within the scope of the present disclosure. The distance between the first location and the second location can be calculated in a step 110. Advantageously, calculating the distance between the first location and the second location can allow for the defect to be located on the surface quickly for repair. As a non-limiting example, the distance between the first location and the second location can be between about 2 millimeters and about 8 millimeters. More specifically, the distance between the first location and the second location can be about 4 millimeters. Advantageously, a distance within the above stated range can allow for thorough inspection of the surface. One of ordinary skill in the art can select other suitable distance between the first location and the second location within the scope of the present disclosure.

With continued reference to FIG. 3, the surface can be illuminated with a light in a step 112. In a step 114, the image of the surface can be captured at the second location. The image taken at the second location can be categorized with an identification number in a step 116. Desirably, the identification number can allow for the defect to be physically located on the surface after it has been discovered and classified. The means for acquiring the image of the surface can be a color camera. The color camera can have a Bayer pixel format. Advantageously, the Bayer pixel format can allow for easier pixel separation and better detection. More specifically, the camera can be a JAI Go series color camera. One of ordinary skill in the art can select other suitable camera for acquiring an image within the scope of the present disclosure.

Figure 4:
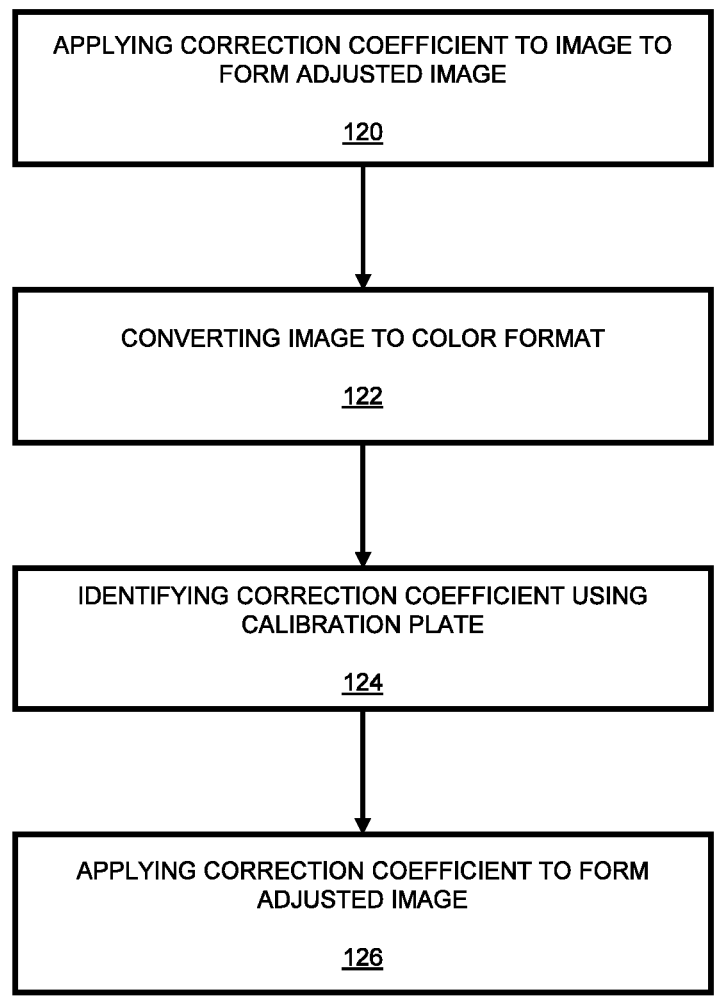
FIG. 4 is a flow diagram illustrating the step of applying the correction coefficient to the image to form the adjusted image.

As shown in FIGS. 2A, 2B, and 4, the method 100 to locate a defect in an e-coat on a surface can include a step 120 of applying a correction coefficient to the image to form an adjusted image, the correction coefficient relating pixel values of the image to a calibration value. With reference to FIG. 4, the step 120 of applying a correction coefficient to the image to form an adjusted image can include a step 122 of converting the image into color image format. The color image format can have a red value, a blue value, and a green value assigned to each of a plurality of pixels of the image. In a step 124, the correction coefficient can be identified using a calibration plate. The calibration plate can act as a normalization step to color correct the image. As a non-limiting example, the calibration plate can be an XRite passport color calibration plate. One of ordinary skill in the art can select other suitable calibration plates within the scope of the present disclosure. The correction coefficient can be applied to each of the plurality of pixels to form an adjusted image in a step 126.

In certain embodiments, the correction coefficient can include a plurality of correction coefficients. Each of the plurality of correction coefficients can correspond to a color value. The red value can have a red correction coefficient. The blue value can have blue correction coefficient. The green value can have a green correction coefficient. Advantageously, the plurality of correction coefficients can minimize the error between the colors of the adjusted image and the expected red value, blue value, and green value of the calibration plate. The plurality of correction coefficients can be applied to each of the plurality of pixels to form an adjusted image.

Figure 5:
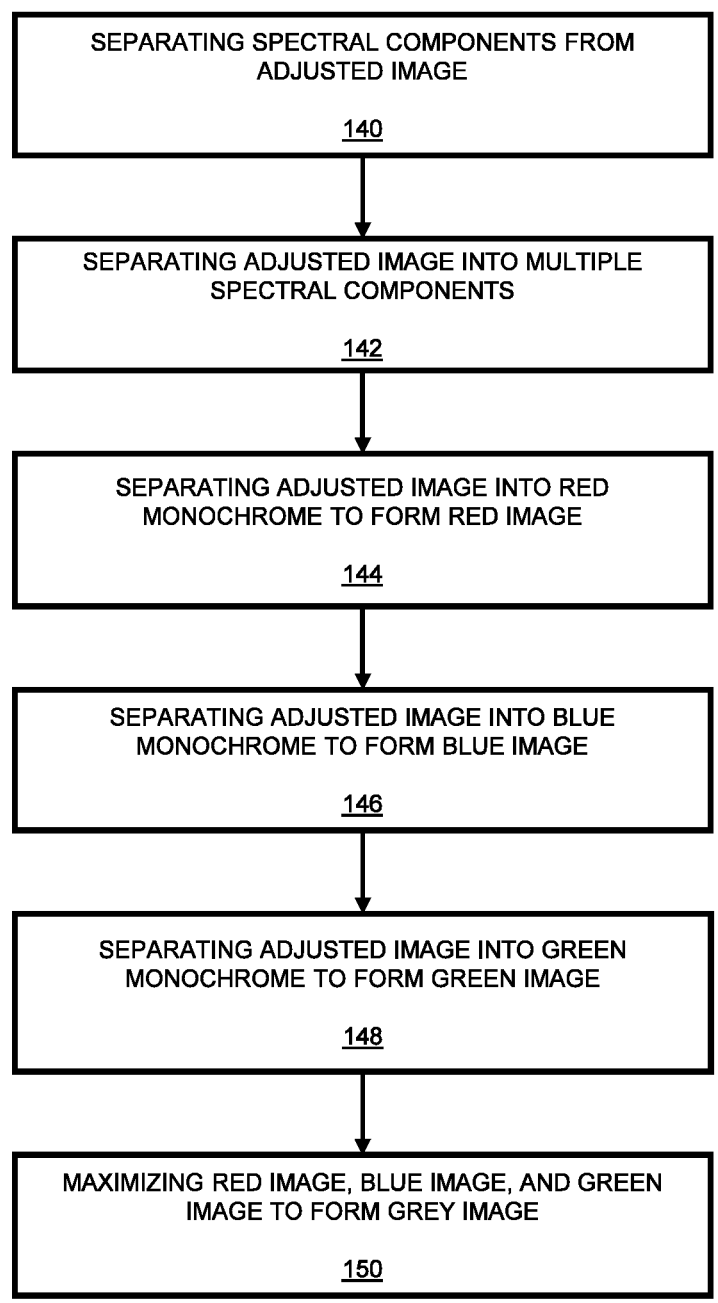
FIG. 5 is a flow diagram illustrating the step of separating a spectral component from the adjusted image.

As shown in FIGS. 2A, 2B, and 5, the method 100 to locate a defect in an e-coat on a surface can include a step 140 of separating a spectral component from the adjusted image at each of the plurality of pixels. With reference to FIG. 5, the step 140 of separating a spectral component from the adjusted image can include a step 142 of separating the adjusted image into multiple spectral components at each of the plurality of pixels. The multiple spectral components can include a step 144 of separating the image into a red monochrome, whereby a red image is created. In a step 146 the image can be separated into a blue monochrome, whereby a blue image is created. In a step 148 the image can be separated into a green monochrome, whereby a green image is created. One or more of the red image, the blue image, and the green image at each of the plurality of pixels can be maximized to form a grey image in a step 150.

Figure 6:
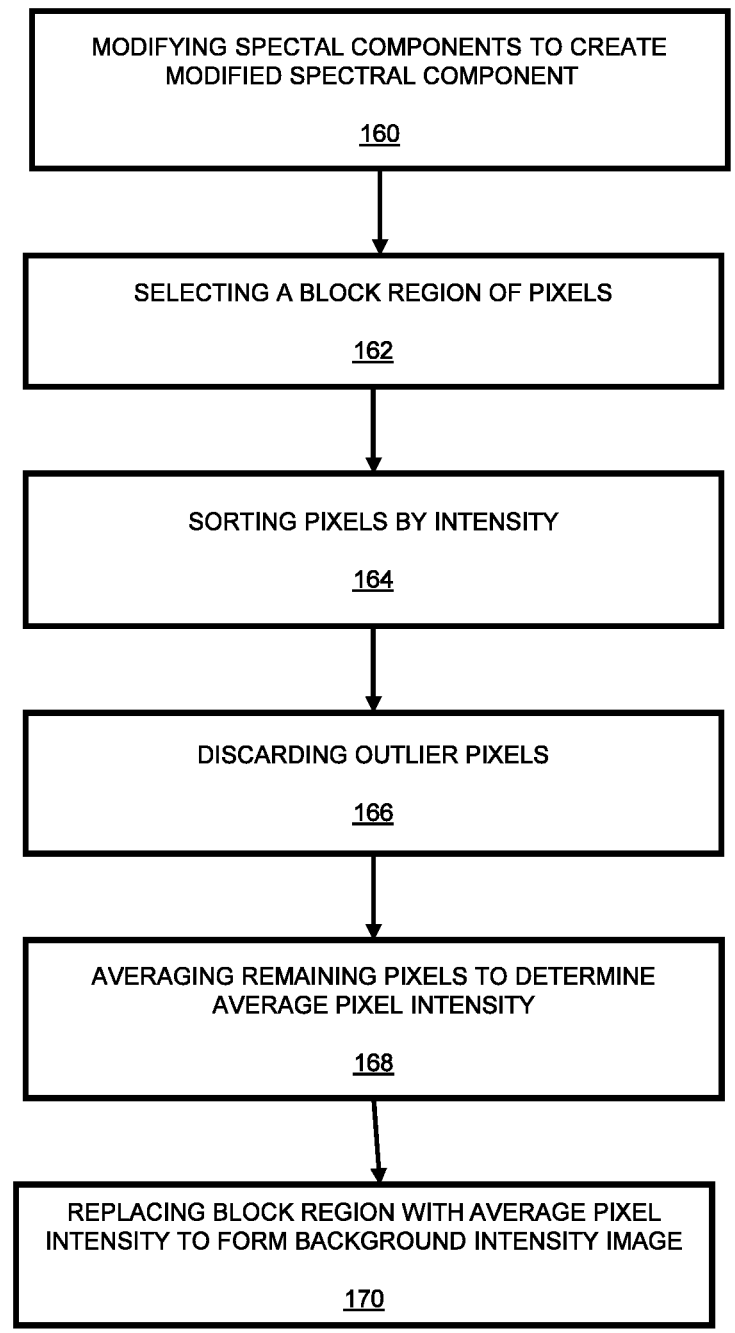
FIG. 6 is a flow diagram illustrating the step of modifying the spectral component to create a modified spectral component.

As shown in FIGS. 2A, 2B, and 6, the method 100 to locate a defect in an e-coat on a surface can include a step 160 of modifying the spectral components to create a modified spectral component, the modifying including a block average determination. As a non-limiting example, the spectral components can be from the red image, the blue image, or the green image. More specifically, the spectral components can be from the grey image. With reference to FIG. 6, the step 160 of modifying the spectral component can include a step 162 of selecting a block region of pixels. The block region can include a block height, a block width, and a percentile limit. In a step 164, the pixels of each block can be sorted by pixel intensity. Where the pixels are sorted by pixel intensity, outlier pixels that fall outside the percentile limit can be identified. The outlier pixels can be discarded in a step 166. The remaining pixels can be averaged to determine an average pixel intensity in a step 168. In a step 170, the block region can be replaced with the average pixel intensity and form a background intensity image.

As a non-limiting example, the block average determination can modify the spectral component by selecting a first block region can be selected having the block width of about 400 pixels, the block height of about 5 pixels, and the percentile limit of about 0.25. A percentile limit of about 0.25 can result in pixels with an intensity below 25% being discarded as well as pixels with an intensity about 75% being discarded. The pixels in the first block region can be sorted by pixel intensity into a histogram ranging in pixel intensity from 0-255. Advantageously, the histogram can be used to calculate the percentile of the pixel intensities. The pixels of the first block region that fall below the percentile limit of 25% intensity and fall above the percentile limit of 75% intensity can be discarded as outlier pixels. The block region can be replaced with the average pixel intensity found in the histogram and form a first background intensity image.

As another non-limiting example, the block average determination with different parameters can be used to modify the first background intensity image. A second block region can be selected having the block width of about 200 pixels, the block height of about 5 pixels, and the percentile limit of about 0.1. A percentile limit of about 0.1 can result in pixels with an intensity below 10% being discarded as well as pixels with an intensity about 90% being discarded. The pixels in the first block region can be sorted by pixel intensity into a histogram. Advantageously, the histogram can be used to calculate the percentile of the pixel intensities. The pixels of the first block region that fall below the percentile limit of 10% intensity and fall above the percentile limit of 90% intensity can be discarded as outlier pixels. The block region can be replaced with the average pixel intensity found in the histogram and form a second background intensity image. Desirably, the second block average determination can help to smooth the intensity differences in the average.

Advantageously, and as detailed in the above examples, the wide block width and short block height can be useful in determining the background intensity image where a light intensity is variable in the y-direction of the adjusted image which commonly occurs when using bright horizontal light to illuminate the surface.

Figure 7:
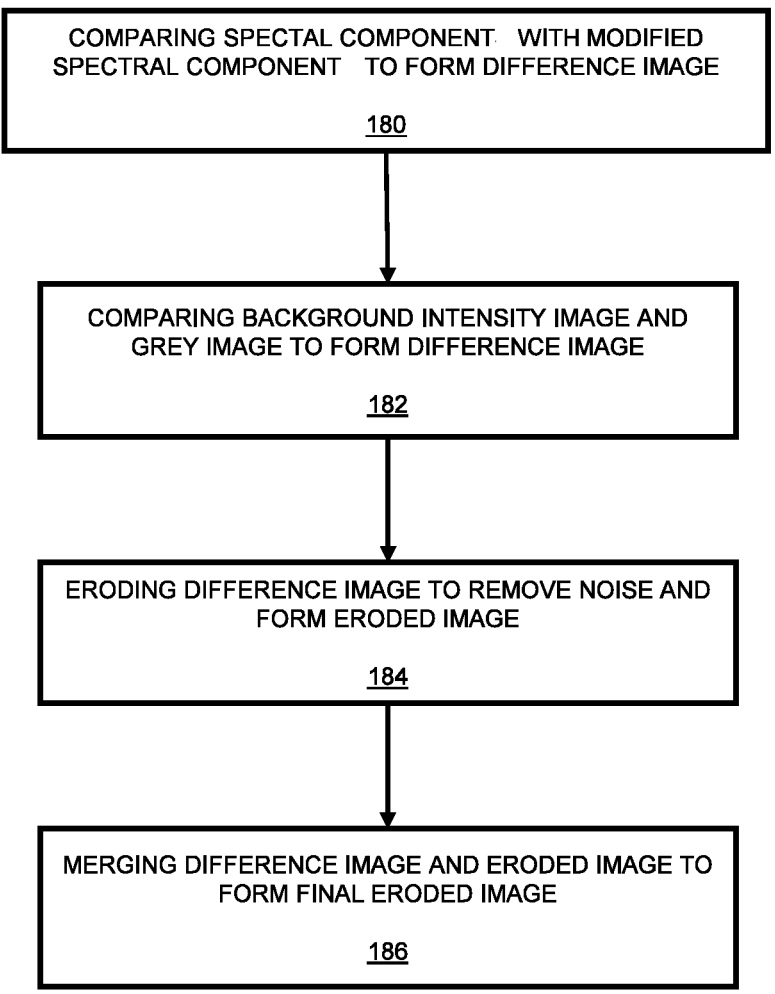
FIG. 7 is a flow diagram illustrating the step of comparing the spectral component with the modified spectral component to form a difference image.

As shown in FIGS. 2A, 2B, and 7, the method 100 to locate a defect in an e-coat on a surface can include a step 180 of comparing the spectral component with the modified spectral component to form a difference image. With reference to FIG. 7, the step 180 of comparing the spectral component with the modified spectral component to form a difference image can include a step 182 of comparing the background intensity image and a grey image at each of the plurality of pixels to form a difference image is created. Where the difference at each of the plurality of pixels between the background intensity image and the grey image is less than a minimum value, the difference image pixel can be zero. Where the difference at each of the plurality of pixels between the background intensity image and the grey image is equal to or greater than the minimum value, the difference image pixel can be the same as the absolute value of the difference. The minimum value can be adjusted to changes in the average intensity. As a non-limiting example, the minimum value can be relatively low at about 10 if the average intensity is less than about 40. As another non-limiting example, the minimum value may increase to about 15 when the average intensity is higher than about 80. The minimum can go as high as about 35 when the average intensity is greater than about 220. One of ordinary skill in the art can select other suitable minimum values within the scope of the present disclosure.

In a step 184, the difference image can be eroded to remove noise and form an eroded image. As a non-limiting example, the difference image can be eroded by about 1 pixel. The difference image can be eroded a second time by another about 1 pixel. One of ordinary skill in the art can select a suitable number of erosions within the scope of the present disclosure to remove noise from the difference image. Where the difference image is eroded to remove noise, an eroded image is formed. In a step 186, the eroded image and the difference image can be merged, according to a baseline value, to form a final eroded image. Where the pixel average intensity is less than the baseline value, the pixel value is zeroed out in the difference image. Where the pixel average intensity is equal to or greater than the baseline value or the pixel exists in the eroded image, the pixel in the difference image and pixel in the eroded image are merged in the final eroded image. One of ordinary skill in the art can select a suitable baseline value within the scope of the present disclosure.

As shown in FIGS. 2A and B, the method 100 to locate a defect in an e-coat on a surface can include a step 200 of dilating and eroding the difference image. Advantageously, dilating and eroding the difference image can allow for regions of pixel to connect and form connected regions. The connected regions can allow for easier detection of the region during blob detection. One of ordinary skill in the art can select a suitable number of dilations and erosions within the scope of the present disclosure.

Figure 8:
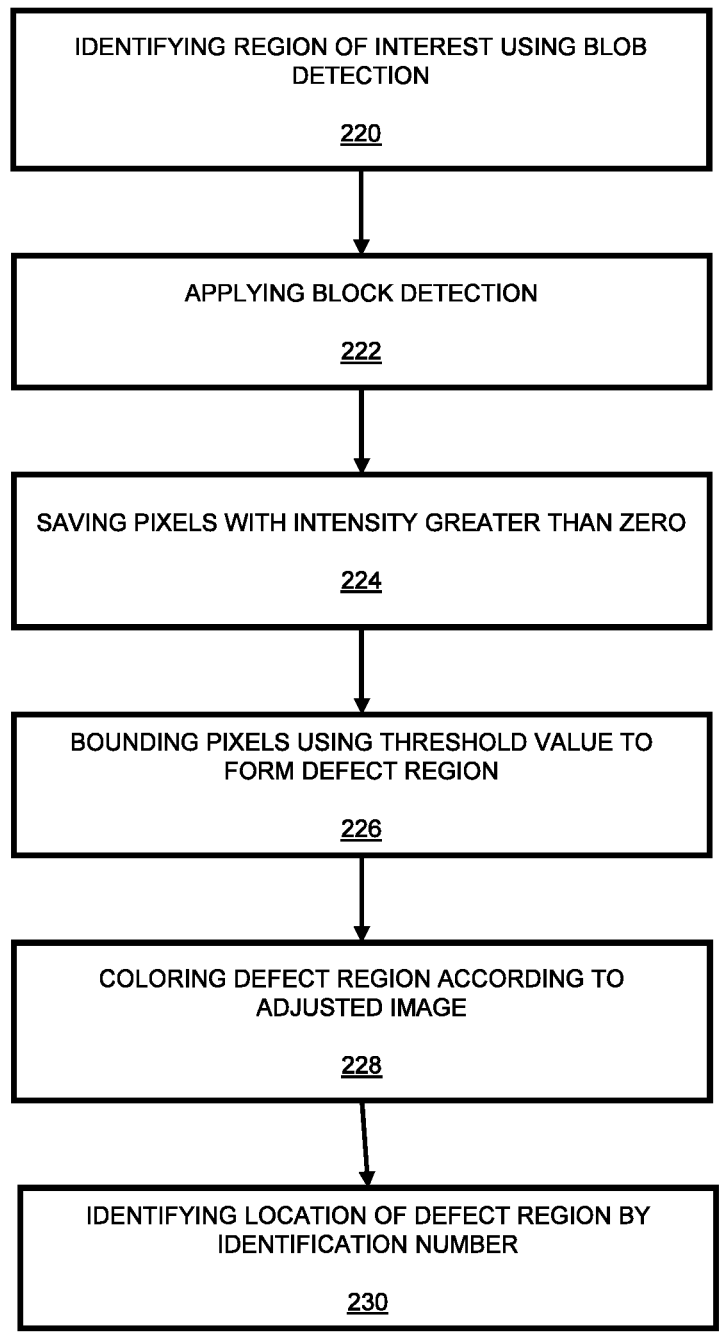
FIG. 8 is a flow diagram illustrating the step of identifying a region of interest using blob detection.

As shown in FIGS. 2A, 2B, and 8, the method 100 to locate a defect in an e-coat on a surface can include a step 220 of identifying a region of interest from the one or more image regions using a blob detection threshold value to locate the defect. With reference to FIG. 8, the step 220 of identifying a region of interest from one or more image regions can include a step 222 of blob detection. The step 222 of using blob detection can include a step 224 of saving pixels with an intensity in the final eroded image greater than zero. In a step 226 the image regions that reach a threshold value number of pixels can be bounded. As a non-limiting example, the threshold value can be greater than 3 pixels. More specifically, the threshold value can be five pixels. One of ordinary skill in the art can select a suitable threshold value within the scope of the present disclosure. Regions that contain less pixels than the threshold value can be discarded. The bounded regions can be a defect region, shown in FIG. 9. Advantageously, discarding regions that contain less pixels than the threshold value can filter down the defect to ensure that only the most valuable defect regions are selected and move onto the next phase of detection. In a step 228, the defect region can be colored according to the adjusted color image. An image identification number can be used to identify the location of the defect region on the surface in a step 230.

As shown in FIGS. 2A and 2B, the method 100 to locate a defect in an e-coat on a surface can include a step 240 of classifying the defect. The defect can be classified using a classifier algorithm to be sorted into various defect types or can be classified as noise. Defects classified as noise can be rejected and discarded in a step 242. As a non-limiting example, the classifier can be a SVM or a deep learning coevolution neural network, such as AlexNet. One of ordinary skill in the art can select a classifier within the scope of the present disclosure.

The defect region can have classification information associated with it. Classification information can include, but is not limited to, shape, position, size and the probability of noise being identified. More specifically, the classification information can include color information because different e-coat defects have different colors. Color information can be used to filter out noise because color is typically the same for the entire vehicle. Where classification information has been obtained and the defect has been classified, the frame identification of the image can be used to locate the defect.

Figure 9:
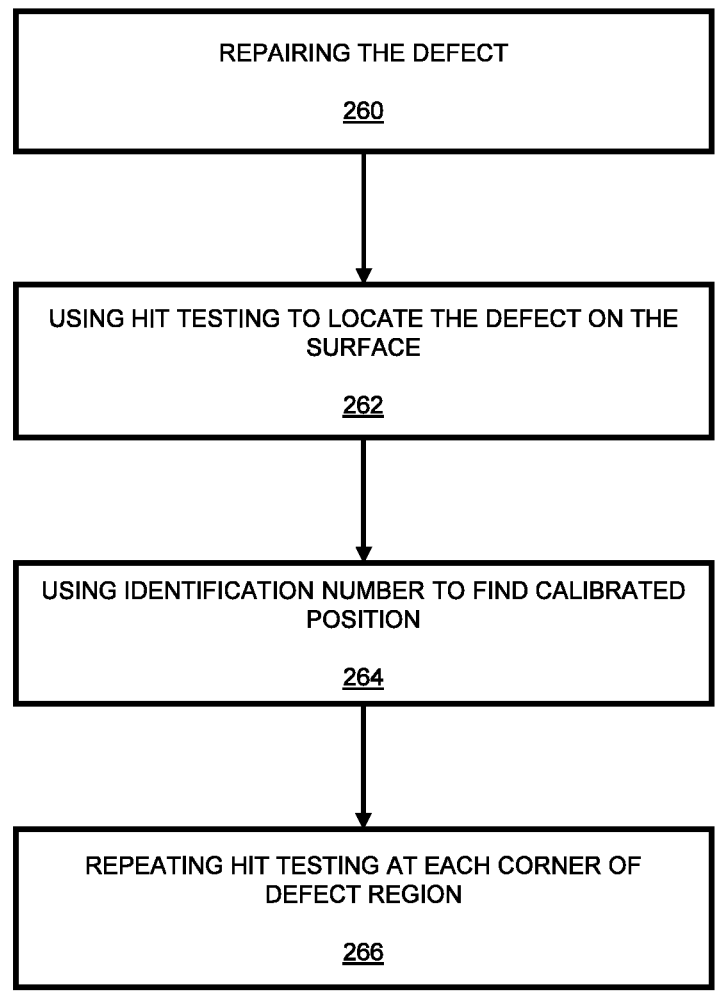
FIG. 9 is a flow diagram illustrating the step of repairing the defect.
Figure 10:
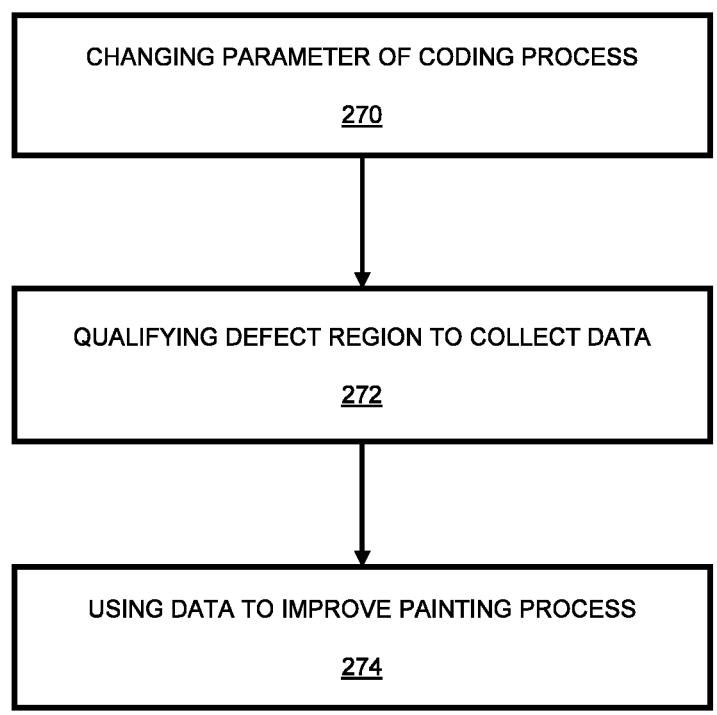
FIG. 10 is a flow diagram illustrating the step of changing a parameter of a coding process.

As shown in FIGS. 9-10, the method 100 to locate a defect in an e-coat on a surface can include a step 260 of performing one of repairing the defect or a step 270 of changing a parameter of an e-coating process to form a modified e-coating process and coating another surface using the modified e-coating process. The step of repairing the defect can include using a hit testing system to locate the physical location of the defect on the surface in a step 262. In a step 264, the hit test can use the identification number of the image to find a calibrated position of the surface and simulate the surface using a 3D CAD model of the surface. The hit testing can be used to trace a ray from the center pixel of the defect region in a computer simulation until it intersects with a point on the 3D CAD model of the surface. Hit testing for the defect region can be repeated at each corner of the defect region in a step 266.

The method 100 of the present disclosure can be repeated multiple times as the surface moves along the conveyor in a step 280. As the surface is moves along the conveyor and several images are taken, multiple images of the same defect can be captured, resulting in multiple defect regions for the same defect in a step 282. Where defect regions are repeated in more than one image, the defect regions can have the same hit test location on the surface. In a step 284, the regions can be clustered together are assumed to be the same defect and can be studied as a group for classification.

The step 270 of changing a parameter of the e-coating to form a modified e-coating process can include qualifying the defect region in a step 272 and using the data collected to measure and improve the painting process in a step 274. As a result, another surface can be e-coated using the modified e-coating process Advantageously, collecting this data can allow for the improvement of e-coating efficiency and accuracy and, as a result, minimize the occurrence of defects. As a non-limiting example, a spray droplet size can be modified to optimize coverage. Further, a spray amount can be altered to minimize over application and/or under application.

The present disclosure also contemplates a system 300 for locating a defect in an e-coat on a surface described hereinabove. The system 300 can include a surface 302 which can be present on a chassis 304. The system 300 can include a camera 306 for acquiring an image and a conveyor 308 for moving the chassis 304 to a first location and a second location. The system can calculate the distance the chassis can move along the conveyor between each image being acquired. The system can include one of more lights to illuminate the surface and allow for a better and more accurate image to be captured. The system can include a graphic processing unit (GPU) for locating a defect in an e-coat on a surface 302.

In certain embodiments, the system can be communicatively coupled to one or more remote platforms. The communicative coupling can include communicative coupling through a networked environment. The networked environment can be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms and remote platforms can be operatively linked via some other communication coupling. The one or more computing platforms can be configured to communicate with the networked environment via wireless or wired connections. In addition, in an embodiment, the one or more computing platforms can be configured to communicate directly with each other via wireless or wired connections. Examples of one or more computing platforms can include, but are not limited to, smartphones, wearable devices, tablets, laptop computers, desktop computers, Internet of Things (IoT) device, or other mobile or stationary devices. In certain embodiments, a system can be provided that can also include one or more hosts or servers, such as the one or more remote platforms connected to the networked environment through wireless or wired connections. According to one embodiment, remote platforms can be implemented in or function as base stations (which can also be referred to as Node Bs or evolved Node Bs (eNBs)). In certain embodiments, remote platforms can include web servers, mail servers, application servers, etc. According to certain embodiments, remote platforms can be standalone servers, networked servers, or an array of servers.

The system can include one or more processors for processing information and executing instructions or operations, including such instructions and/or operations stored on one or more non-transitory mediums. One or more processors can be any type of general or specific purpose processor. In some cases, multiple processors can be utilized according to other embodiments. In fact, the one or more processors can include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In some cases, the one or more processors can be remote from the one or more computing platforms. The one or more processors can perform functions associated with the operation of system which can include, for example, precoding of antenna gain/phase parameters, encoding and decoding of individual bits forming a communication message, formatting of information, and overall control of the one or more computing platforms, including processes related to management of communication resources.

The system can further include or be coupled to a memory (internal or external), which can be coupled to one or more processors, for storing information and instructions that can be executed by one or more processors, including any instructions and/or operations stored on one or more non-transitory mediums. Memory can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory can consist of any combination of random access memory (RAM), read only memory (ROM), static storage such as a magnetic or optical disk, hard disk drive (HDD), or any other type of non-transitory machine or computer readable media. The instructions stored in memory can include program instructions or computer program code that, when executed by one or more processors, enable the one or more computing platforms to perform tasks as described herein.

In some embodiments, one or more computing platforms can also include or be coupled to one or more antennas for transmitting and receiving signals and/or data to and from one or more computing platforms. The one or more antennas can be configured to communicate via, for example, a plurality of radio interfaces that can be coupled to the one or more antennas. The radio interfaces can correspond to a plurality of radio access technologies including one or more of LTE, 5G, WLAN, Bluetooth, near field communication (NFC), radio frequency identifier (RFID), ultrawideband (UWB), and the like. The radio interface can include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method of locating a defect in an e-coat on a surface, comprising:
　acquiring an image of the surface;
　applying a correction coefficient to the image to form an adjusted image, the correction coefficient relating pixel values of the image to a calibration value;
　separating a spectral component from the adjusted image each of the plurality of pixels;
　modifying the spectral component to create a modified spectral component, the modifying including a block average determination;
　comparing the spectral component with the modified spectral component to form a difference image;
　dilating and eroding the difference image;
　identifying a region of interest from a one or more image regions using a blob detection threshold value to locate the defect;
　classifying the defect; and
　performing one of:
　　repairing the defect; and
　　changing a parameter of an e-coating process to form a modified e-coating process and coating another surface using the modified e-coating process.

2. The method of claim 1, wherein the step of acquiring the image of the surface includes:
　placing the surface on a conveyor at a first location;
　moving the surface along the conveyor to a second location spaced away from the first location;
　tracking the second location with respect to the first location using a tracking device;
　calculating a distance between the first location and the second location;
　illuminating the surface with a light;
　capturing the image of the surface at the second location; and
　categorizing the image at the second location, thereby allowing for the defect to be physically located on the surface after it has been discovered and classified.

3. The method of claim 2, wherein the tracking device one of a rotary encoder and a laser.

4. The method of claim 2, wherein a distance between the first location and the second location is between 2 mm and 8 mm.

5. The method of claim 2, wherein a distance between the first location and the second location is 4 mm.

6. The method of claim 1, wherein acquiring the image of the surface uses a color digital camera.

7. The method of claim 6, wherein the color digital camera has a Bayer pixel format.

8. The method of claim 1, wherein the step of applying a correction coefficient to the image to form an adjusted image, the correction coefficient relating pixel values of the image to a calibration value, includes:
　converting the image into a color image format, wherein the color image format has a red value, a blue value, and a green value assigned to each of a plurality of pixels of the image;
　identifying the correction coefficient using a calibration plate; and
　applying the correction coefficient to each of the plurality of pixels to form an adjusted image.

9. The method of claim 8, wherein the calibration value includes a plurality of calibration values.

10. The method of claim 9, wherein the calibration plate includes an XRite passport color calibration plate.

11. The method of claim 10, wherein the step of separating a spectral component from the adjusted image includes separating the adjusted image into multiple spectral components.

12. The method of claim 11, wherein the multiple spectral components include:
　separating the adjusted image into a red monochrome to form a red image;
　separating the adjusted image into a blue monochrome to form a blue image;
　separating the adjusted image into a green monochrome to form a green image; and
　maximizing at least one of the red image, the blue image, and the green image at each one of the plurality of pixels to form a grey image.

13. The method of claim 1, wherein the step of modifying the spectral component to create a modified spectral component, the modifying including a block average determination, includes:
　selecting a block region made of pixels, the block regions having a block height, a block width, and a percentile limit;
　sorting the pixels of each block region by pixel intensity;
　discarding outlier pixels outside the percentile limit;
　averaging remaining pixels, whereby an average pixel intensity is determined; and replacing the block region with the average pixel intensity to form a background intensity image.

14. The method of claim 1, wherein the step of comparing the spectral component with the modified spectral component to form a difference image, includes:
   comparing a background intensity image and a grey image at each of the plurality of pixels to form a difference image;
   eroding the difference image to remove noise to form an eroded image; and
   merging the difference image and the eroded image using a baseline value to form a final eroded image.

15. The method of claim 1, wherein the step of identifying a region of interest from the one or more image regions using a blob detection threshold value to locate the defect, includes:
   saving pixels with an intensity in a final eroded image greater than zero;
   bounding pixels using the threshold value to form a defect region;
   coloring the defect region according to the adjusted image; and
   using an image identification number to identify the location of the defect region.

16. The method of claim 15, wherein the threshold value is five pixels.

17. The method of claim 13, wherein the step of comparing the spectral component with the modified spectral component to form a difference image, includes:
   comparing a background intensity image and the grey image at each of the plurality of pixels to form a difference image;
   eroding the difference image to remove noise to form an eroded image; and
   merging the difference image and the eroded image using a baseline value to form a final eroded image.

18. The method of claim 1, wherein the step of repairing the defect includes using a hit testing system to locate the defect on the surface.

19. The method of claim 18, wherein the hit testing system uses a calibrated position of the surface.

* * * * *